(12) United States Patent
An et al.

(10) Patent No.: US 9,207,366 B2
(45) Date of Patent: Dec. 8, 2015

(54) CAMERA MODULE

(75) Inventors: Myoung Jin An, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 139 days.

(21) Appl. No.: 13/605,480

(22) Filed: Sep. 6, 2012

(65) Prior Publication Data

US 2013/0077183 A1    Mar. 28, 2013

(30) Foreign Application Priority Data

Sep. 28, 2011    (KR) .................. 10-2011-0098609

(51) Int. Cl.
*G02B 7/02*    (2006.01)
*G02B 3/00*    (2006.01)

(52) U.S. Cl.
CPC ............ *G02B 3/0062* (2013.01); *G02B 3/0075* (2013.01); *G02B 7/021* (2013.01); *G02B 7/022* (2013.01); *G02B 7/026* (2013.01)

(58) Field of Classification Search
CPC ........ G02B 7/022; G02B 7/021; G02B 7/025; G02B 7/08; G02B 7/102; G02B 7/02; G02B 26/124; G02B 7/026; G02B 3/0062; G02B 3/0075
USPC .......................................... 359/819, 811, 829
See application file for complete search history.

(56) References Cited

U.S. PATENT DOCUMENTS

| 7,916,411 | B1 * | 3/2011 | Lee et al. ....................... 359/819 |
| 2005/0030647 | A1 | 2/2005 | Amanai | |
| 2006/0158748 | A1 * | 7/2006 | Hirata et al. .................. 359/811 |
| 2006/0221469 | A1 | 10/2006 | Ye | |
| 2007/0206934 | A1 * | 9/2007 | Ishii et al. ....................... 396/55 |
| 2008/0252775 | A1 * | 10/2008 | Ryu et al. ...................... 348/374 |
| 2008/0278621 | A1 * | 11/2008 | Cho et al. ....................... 348/374 |
| 2010/0033616 | A1 * | 2/2010 | Huang et al. .................. 348/335 |
| 2011/0205648 | A1 * | 8/2011 | Takei et al. .................... 359/824 |
| 2012/0133825 | A1 * | 5/2012 | Nakajima et al. ............. 348/374 |
| 2012/0218651 | A1 * | 8/2012 | Onishi et al. .................. 359/824 |

FOREIGN PATENT DOCUMENTS

| JP | H075353 A | 1/1995 |
| JP | 2004-029554 A | 1/2004 |
| JP | 2004-252281 A | 9/2004 |
| JP | 2006-284788 A | 10/2006 |
| JP | 2007-292845 A | 11/2007 |
| JP | 2008-233512 A | 10/2008 |
| JP | 2009-163120 A | 7/2009 |
| JP | 2009-258560 A | 11/2009 |
| JP | 2011-070016 A | 4/2011 |

OTHER PUBLICATIONS

Office Action dated Oct. 23, 2012 in Korean Application No. 10-2011-0098609, filed Sep. 28, 2011.
Office Action dated Oct. 22, 2013 in Japanese Application No. 2012-197330, filed Sep. 7, 2012.
Office Action dated Sep. 8, 2015 in Japanese Application No. 2012-197330, filed Sep. 7, 2012.

* cited by examiner

*Primary Examiner* — Ricky Mack
*Assistant Examiner* — Daniele Manikeu
(74) *Attorney, Agent, or Firm* — Saliwanchik, Lloyd & Eisenschenk

(57) ABSTRACT

Disclosed is a camera module. The camera module includes a lens barrel; a first lens unit having a first outer peripheral shape in the lens barrel; a second lens unit having a second outer peripheral shape in the lens barrel; and a housing coupled with the lens barrel.

17 Claims, 6 Drawing Sheets

CAMERA MODULE

CROSS-REFERENCE TO RELATED APPLICATION

This application claims the benefit under 35 U.S.C. §119 of Korean Patent Application No. 10-2011-0098609, filed Sep. 28, 2011, which is hereby incorporated by reference in its entirety.

TECHNICAL FIELD

The embodiment relates to a camera module.

BACKGROUND ART

Recently, a camera module has been installed in a mobile communication terminal, an information technology (IT) device, such as a PDA or an MP3 player, a vehicle, and an endoscope. As the technology has been developed toward the high-pixel camera module from the conventional VGA camera equipped with 0.3 mega pixels, the camera module has been manufactured in a small size with a slim structure according to targets to which the camera module is installed. In addition, the camera module has been equipped with various additional functions, such as auto-focusing or optical zoom functions, at the low manufacturing cost.

Meanwhile, the camera module manufactured in these days is equipped with an image sensor module, which is manufactured through a COB (chip of board) scheme, a COF (chip of flexible) scheme or a CSP (chip scale package) scheme, and is usually connected to a main substrate through an electric connection unit, such as a PCB (printed circuit board) or an FPCB (flexible printed circuit board).

However, users recently request the camera module, which can be directly mounted on the main substrate similar to a general passive element, in such a manner that the manufacturing process for the camera module can be simplified while reducing the manufacturing cost.

The camera module is generally manufactured by attaching an image sensor, such as a CCD or a CMOS, to a substrate through the COB scheme or the COF scheme. An image of a subject is focused by the image sensor and the focused image is stored as data in a memory, which is installed inside or outside the camera module. In addition, the stored data are converted into electric signals and the electric signals are displayed as images through a display medium, such as an LCD or a PC monitor provided in a device.

A camera module according to the related art includes a housing, an image sensor supported on a bottom of the housing to convert an image signal received through a lens into an electric signal, a lens group to focus an image signal of a subject to the image sensor, and a barrel in which the lens group are stacked. The housing, the lens group and the barrel are sequentially coupled with each other.

In addition, an FPCB mounted thereon with chip components, which are electric components serving as a condenser and a resistor to drive the image sensor including a CCD or a CMOS, is electrically connected to the bottom of the housing.

In the camera module having the above structure according to the related art, in a state that a plurality of circuit components have been mounted on the FPCB, an ACF (anisotropic conductive film) is inserted between the substrate and the image sensor, and heat and pressure are applied thereto in such a manner that the substrate, the image sensor and the ACF are fixedly bonded and electrically connected with each other and an IR cut-off filter is attached to an opposite side.

In addition, in a state that the barrel provided therein with a plurality of lens groups is temporally screw-coupled with the housing, as described above, the assembled FPCB is fixedly bonded to the bottom of the housing by an adhesive.

Meanwhile, after the FPCB, to which the image sensor is attached, has been fixedly bonded to the housing coupled with the barrel, a focus adjustment is carried out with respect to a subject (resolution chart) located in front of the barrel and spaced apart from the barrel by a predetermined distance. At this time, the focus adjustment of the camera module can be achieved between the lens group and the image sensor while adjusting the vertical displacement by rotating the barrel screw-coupled with the housing.

DISCLOSURE

Technical Problem

The embodiment provides a camera module having a smaller size and improved performance.

Technical Solution

A camera module according to the embodiment includes a lens barrel; a first lens unit having a first outer peripheral shape in the lens barrel; a second lens unit having a second outer peripheral shape in the lens barrel; and a housing coupled with the lens barrel.

Advantageous Effects

In the camera module according to the embodiment, lens units having outer peripheral shapes different from each other are disposed in the lens barrel. Especially, according to the camera module of the embodiment, lens units having sizes, outer peripheral shapes and performances different from each other can be disposed in the lens barrel.

For instance, the lens units, which may not require the high performance, can be formed by forming a plurality of substrates, laminating the substrates and cutting the substrates at a time. Thus, lens units having polygonal outer peripheral shapes can be formed.

In addition, the lens units, which may require the high performance, can be formed by processing the lens units such that the lens units may have the desired outer peripheral shapes. Thus, lens units having circular shapes can be formed.

That is, since the lens units requiring the high performance may occupy a relatively large area, the lens units are processed to have the circular outer peripheral shapes and disposed in the cylindrical lens barrel. Therefore, the high-performance lens units can be aligned in the lens barrel while maximizing the space utilization in the lens barrel.

In addition, the lens units, which may not require the high performance, have the polygonal outer peripheral shapes such that the lens units can be manufactured in mass production. Since these lens units may not occupy the large area, the lens units can be readily aligned in the lens barrel.

In other words, according to the camera module of the embodiment, the lens units can be disposed in the lens barrel by varying the outer peripheral shapes of the lens units according to the performance thereof. Thus, the camera module according to the embodiment can maximize the space utilization in the lens barrel based on the performance and manufacturability of the lens units.

Therefore, the camera module according to the embodiment can be readily manufactured with small size and improved performance.

BEST MODE FOR INVENTION

Figure 1:
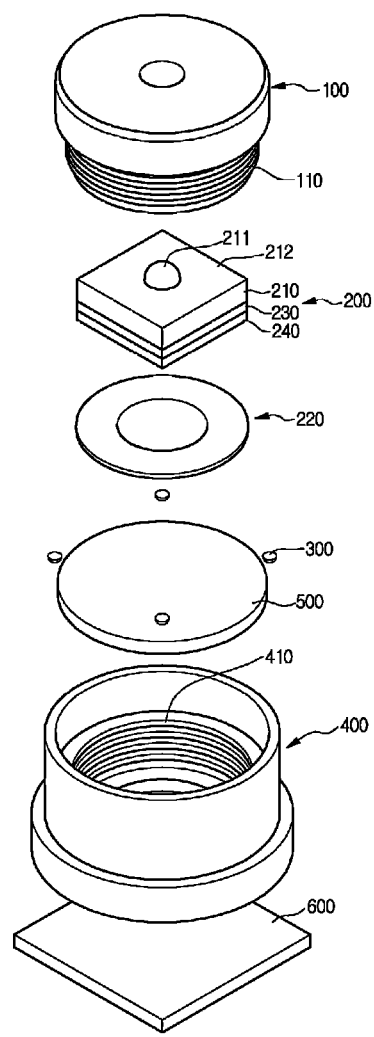
FIG. 1 is an exploded perspective view showing a camera module according to the embodiment.

In the description of the embodiments, it will be understood that when each lens, unit, part, hole, protrusion, groove or layer is referred to as being "on" or "under" another lens, unit, part, hole, protrusion, groove or layer, it can be "directly" or "indirectly" on the other lens, unit, part, hole, protrusion, groove or layer or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
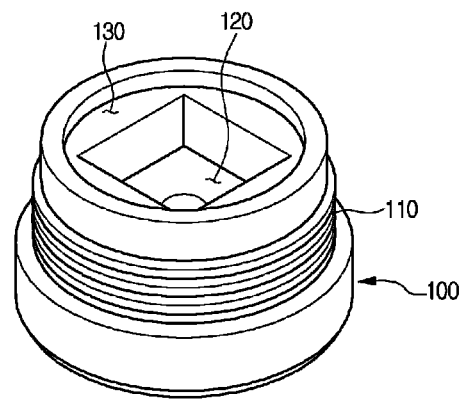
FIG. 2 is a perspective view showing a lower portion of a lens barrel.
Figure 3:
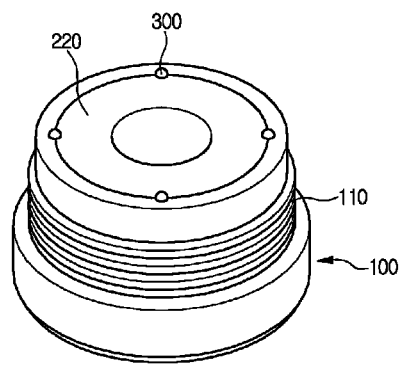
FIG. 3 is a perspective view showing a lens assembly and a second lens unit assembled with a lens barrel.
Figure 4:
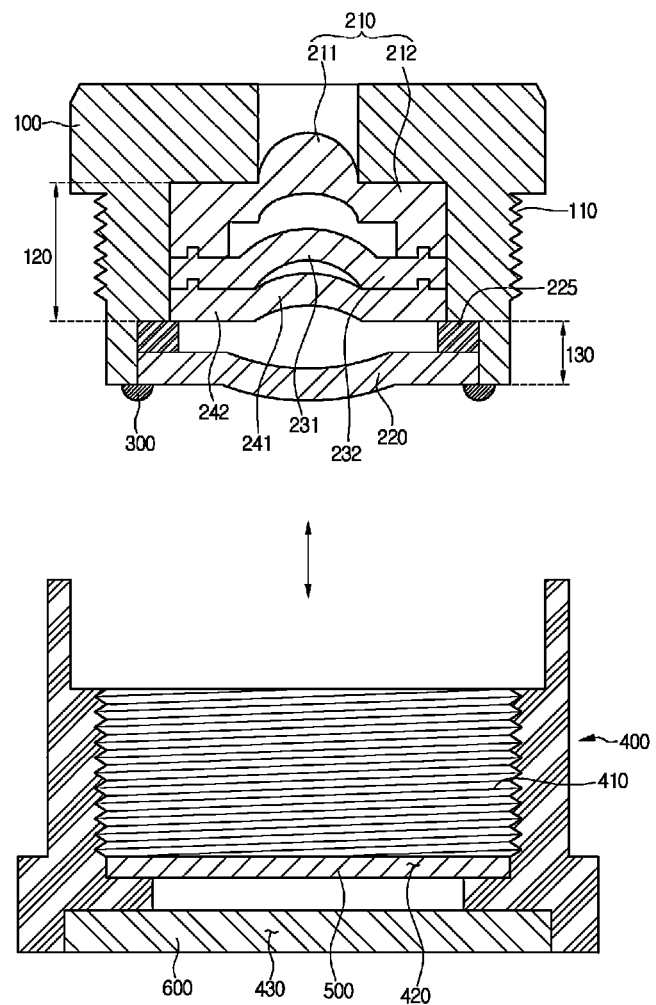
FIG. 4 is a sectional view showing a camera module according to the embodiment.
Figure 5:
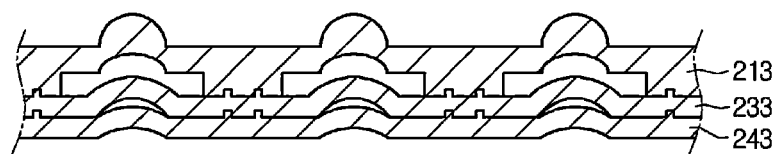
FIGS. 5 and 6 are sectional views showing a procedure for manufacturing a lens assembly.
Figure 6:
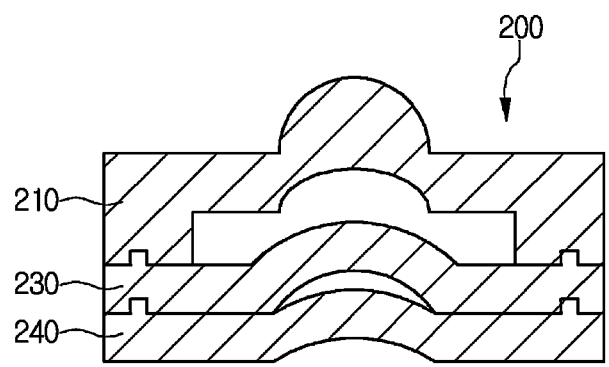

FIG. 1 is an exploded perspective view showing a camera module according to the embodiment, FIG. 2 is a perspective view showing a lower portion of a lens barrel, FIG. 3 is a perspective view showing a lens assembly and a second lens unit assembled with a lens barrel, FIG. 4 is a sectional view showing a camera module according to the embodiment, and FIGS. 5 and 6 are sectional views showing a procedure for manufacturing a lens assembly.

Referring to FIGS. 1 to 6, the camera module according to the embodiment includes a lens barrel 100, a lens assembly 200, a second lens unit 220, a fixing unit 300, a housing 400, an IR cut-off filter unit 500 and a sensor unit 600.

The lens barrel 100 receives the lens assembly 200 and the second lens unit 220 therein.

The lens barrel 100 has a first receiving groove 120 for receiving the lens assembly 200. The first receiving groove 120 may have a shape corresponding to a shape of the lens assembly 200. When viewed from the bottom, the first receiving groove 120 may have a polygonal shape. In detail, when viewed from the bottom, the first receiving groove 120 may have a quadrangular shape. That is, the first receiving groove 120 may have a quadrangular outer peripheral shape. In more detail, when viewed from the bottom, the first receiving groove 120 may have a rectangular shape. Further, when viewed from the bottom, the first receiving groove 120 may have a square shape.

In addition, the lens barrel 100 has a second receiving groove 130 for receiving the second lens unit 220. The second receiving groove 130 may have a shape corresponding to a shape of the second lens unit 220. When viewed from the bottom, the second receiving groove 130 may have a circular shape. In detail, the second receiving groove 130 may have a circular outer peripheral shape.

The first and second receiving grooves 120 and 130 are connected with each other. The first and second receiving grooves 120 and 130 are directly connected with each other. In detail, the first receiving groove 120 is disposed closer to an object as compared with the second receiving groove 130. That is, the first receiving groove 120 is formed over the second receiving groove 130.

The first receiving groove 120 may have a surface area smaller than a surface area of the second receiving groove 130. That is, an outer peripheral portion of the first receiving groove 120 is disposed within an outer peripheral portion of the second receiving groove 130. Thus, a step difference is formed between the first and second receiving grooves 120 and 130. In detail, the step difference is formed between an inner surface of the first receiving groove 120 and an inner surface of the second receiving groove 130.

The lens barrel 100 may have a cylindrical shape. That is, the lens barrel 100 may have a circular outer peripheral shape.

The lens barrel 100 may be coupled with the housing 400. In detail, the lens barrel 100 may be screw-coupled with the housing 400. A male screw part 110 is formed on an outer peripheral surface of the lens barrel 100. The male screw part 110 of the lens barrel 100 is screw-coupled with a female screw part 410 of the housing 400. That is, the male screw part 110 of the lens barrel 100 is coupled with the female screw part 410 of the housing 400 in a male-female combination. An interval between the second lens unit 220 and the sensor unit 600 can be adjusted by using the male screw part 110 and the female screw part 410. That is, the interval between the second lens unit 220 and the sensor unit 600 can be adjusted by rotating the lens barrel 100. Thus, the position of the sensor unit 600 can be adjusted such that the sensor unit 600 is located in the whole focal length of the lens assembly 200 and the second lens unit 220. That is, the focus among the lens assembly 200, the second lens unit 220 and the sensor unit 600 can be adjusted through the coupling of the lens barrel 100 and the housing 600.

In addition, the lens barrel 100 includes a light incident groove, which is open upward (toward an object). The light incident groove exposes the lens assembly 200. An image is incident into the lens assembly 200 through the light incident groove.

The lens assembly 200 is disposed in the lens barrel 100. In detail, the lens assembly 200 is disposed in the first receiving groove 120. The lens assembly 200 is inserted into the first receiving groove 120. The lens assembly 200 has a first outer peripheral shape. In detail, the lens assembly 200 has a polygonal outer peripheral shape. In more detail, the lens assembly 200 has a polygonal shape when viewed from the top. In addition, the lens assembly 200 may have a quadrangular shape when viewed from the top. In detail, the lens assembly 200 may have a square shape when viewed from the top.

The lens assembly 200 includes a plurality of lens units. For instance, the lens assembly 200 may include a first lens unit 210, a third lens unit 230 and a fourth lens unit 240. The fourth lens unit 240, the third lens unit 230 and the first lens unit 210 are sequentially laminated.

The first lens unit 210 includes a first lens 211 and a first support part 212. The first lens 211 includes a curved surface. The first support part 212 extends in the lateral direction from the first lens 211. The first lens 211 may be integrally formed with the first support part 212. The first support part 212 is formed with a guide groove for fixing the second lens unit 220 in a desired position.

The third lens unit 230 is disposed under the first lens unit 210. In detail, the third lens unit 230 is disposed between the first lens unit 210 and the second lens unit 220. The third lens unit 230 includes a third lens 231 and a third support part 232. The third lens 231 includes a curved surface. The third support part 232 extends in the lateral direction from the third lens 231. The third lens 231 may be integrally formed with the third support part 232. The third support part 232 is formed with a guide groove for fixing the fourth lens unit 240 in a desired position. In addition, the third support part 232 is formed on a top surface thereof with a guide protrusion fixed to the first lens unit 210.

The fourth lens unit 240 is disposed under the third lens unit 230. In detail, the fourth lens unit 240 is disposed between the third lens unit 230 and the second lens unit 220. The fourth lens unit 240 includes a fourth lens 241 and a fourth support part 242. The fourth lens 241 includes a curved surface. The fourth support part 242 extends in the lateral direction from the fourth lens 241. The fourth lens 241 may be integrally formed with the fourth support part 242. The fourth support part 242 is formed on a top surface thereof with a guide protrusion fixed to the third lens unit 230.

Although it has been described that the lens assembly 200 includes three lens units, the embodiment is not limited thereto. That is, the lens assembly 200 may include one or two lens units or at least four lens units.

In addition, the lens assembly 200 may include polymer. That is, the lens assembly 200 can be formed by using the polymer. In detail, the first lens unit 210, the second lens unit 220 and the third lens unit 230 may include transparent polymer, such as acryl resin.

The lens assembly 200 can be formed through the following process.

Referring to FIG. 5, a plurality of lens array substrates 213, 233 and 243 are sequentially laminated. The lens array substrates 213, 233 and 243 include a plurality of lenses. For instance, the fourth lens array substrate 243, the third lens array substrate 233 and the first lens array substrate 213 are sequentially laminated.

Referring to FIG. 6, the first lens array substrate 213, the third lens array substrate 233 and the fourth lens array substrate 243 are simultaneously cut in a state that they are laminated. Thus, a plurality of lens assemblies 200 can be formed at a time. Thus, the first lens unit 210, the third lens unit 230 and the fourth lens unit 240 may have the same outer peripheral shape. That is, all of the first lens unit 210, the third lens unit 230 and the fourth lens unit 240 may have the first outer peripheral shape. In addition, the lens assemblies 200 may have the quadrangular shape when viewed from the top.

That is, since the lens assembly 200 is formed through the lamination and cutting processes, the lens assembly 200 inevitably has the polygonal outer peripheral shape.

The second lens unit 220 is disposed in the second receiving groove 130. The second lens unit 220 is located far away from the object as compared with the lens assembly 200. That is, the second lens unit 220 is disposed under the lens assembly 200.

The second lens unit 220 has a second outer peripheral shape different from the first outer peripheral shape. In detail, the second lens unit 220 may have a circular shape. That is, the second lens unit 220 may have a circular outer peripheral shape. In addition, the second lens unit 220 may have a meniscus shape.

The second lens unit 220 may have a surface area larger than a surface area of the lens assembly 200. That is, the second lens unit 220 may have a surface area larger than a surface area of the first lens unit 210, the third lens unit 230, and the fourth lens unit 240.

The second lens unit 220 includes glass or transparent polymer. That is, glass or polymer can be used as an example of a material for the second lens unit 220. Especially, the glass may be used as a material for the second lens unit 220.

In addition, although not shown in the drawings, a fifth lens unit may be disposed between the lens assembly 200 and the second lens unit 220. The fifth lens unit may have an outer peripheral shape the same as that of the second lens unit 220.

A spacer 225 may be disposed between the second lens unit 220 and the lens assembly 200. The second lens unit 220 is spaced apart from the lens assembly 200 by the spacer 225. The spacer 225 may have a ring shape.

The fixing unit 300 fixes the lens assembly 200 and the second lens unit 220 to the lens barrel 100. The fixing unit 300 is bonded to the lens barrel 100 and the second lens unit 220. In detail, the fixing unit 300 is bonded to bottom surfaces of the lens barrel 100 and the second lens unit 220. In more detail, the fixing unit 300 is directly bonded to the bottom surfaces of the lens barrel 100 and the second lens unit 220.

The fixing unit 300 may have a dot shape. In detail, a plurality of fixing units 300 can be provided in the form of dots while being spaced apart from each other. The fixing unit 300 may be disposed at an edge of the bottom surface of the lens assembly 200.

The fixing unit 300 may include polymer having superior adhesive property, such as epoxy resin. The fixing unit 300 is bonded only to the outer peripheral portion of the second lens unit 220. Thus, the fixing unit 300 may not interfere with the light incident into the lens assembly 200.

In addition, since the fixing unit 300 has the dot shape, the fixing unit 300 can simply and easily fix the lens assembly 200 and the second lens unit 220 to the lens barrel 100. That is, after a resin composition has been coated on a region between the lens assembly 200 and the lens barrel 100, the resin composition is cured. Thus, the fixing unit 300 can be formed through a simple process.

The housing 400 receives the sensor unit 600 and the IR cut-off filter unit 500. The housing 400 is coupled with the lens barrel 100. In detail, the housing 400 is screw-coupled with the lens barrel 100. As described above, the female screw part 410 of the housing 400 is screw-coupled with the male screw part 110 of the lens barrel 100.

The housing 400 may be formed by using plastic. The housing 400 may have a cylindrical shape. In addition, the housing includes a receiving groove 420 for receiving the IR cut-off filter unit 500 and a receiving groove 430 for receiving the sensor unit 600.

The IR cut-off filter unit 500 is disposed in the housing 400. The IR cut-off filter unit 500 filters the incident infrared ray. The IR cut-off filter unit 500 may block the light having excessive long wavelength incident into the sensor unit 600.

The IR cut-off filter unit 500 can be formed by alternately depositing titanium oxide and silicon oxide on optical glass. In order to block the infrared ray, the thickness of the titanium oxide and silicon oxide can be property adjusted.

The sensor unit 600 is accommodated in the housing 400. The sensor unit 600 may include a CCD image sensor or a CMOS image sensor. In addition, the sensor unit 400 further includes a circuit board connected to the image sensor. The sensor unit 600 converts incident images into electric signals.

In the camera module according to the embodiment, lens units having outer peripheral shapes different from each other are arranged in the lens barrel 100. Especially, according to the camera module of the embodiment, lens units having sizes, outer peripheral shapes and performances different from each other can be arranged in the lens barrel 100.

For instance, the lens assembly 200 may not require the high performance. That is, the lens assembly 200 may include lenses having small sizes. Thus, even if the lens assembly 200 has the polygonal outer peripheral shape through the lamination and cutting processes, since the lens assembly 200 has the small-size lenses, the lens assembly 200 having the small size can be arranged in the lens barrel 100.

In contrast, the second lens unit 220 may require the high performance. Thus, the lens of the second lens unit 220 may have a large size. In this regard, the second lens unit 220 may be processed such that the second lens unit 220 may have the circular outer peripheral shape. In this case, the second lens unit 330 having the circular outer peripheral shape is disposed in the cylindrical lens barrel 100. Thus, the second lens unit 220 can be arranged in the lens barrel 100 while maximizing the space utilization.

That is, the lens assembly 200 has the polygonal outer peripheral shape suitable for the mass production, but the lens assembly 200 does not occupy the large area, so the lens assembly 200 can be readily arranged in the lens barrel 100. In addition, since the second lens unit 220 has a large surface area, the second lens unit 220 is formed with the circular outer peripheral shape to maximize the space utilization.

That is, according to the camera module of the embodiment, the lens units can be disposed in the lens barrel 100 by varying the outer peripheral shapes of the lens units according to the performance thereof. Thus, the camera module according to the embodiment can maximize the space utilization in the lens barrel 100 based on the performance and manufacturability of the lens units.

Therefore, the camera module according to the embodiment can be readily manufactured with small size and improved performance.

Figure 7:
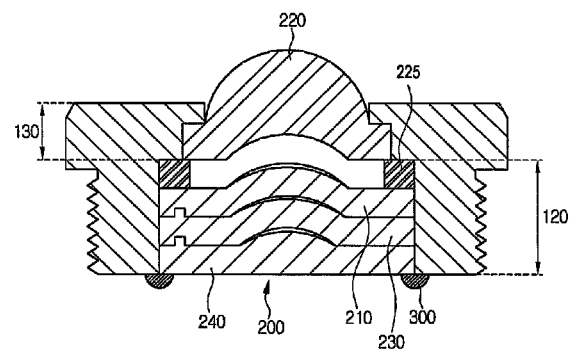
FIG. 7 is a sectional view showing a lens barrel, a lens assembly and a second lens unit according to another embodiment.
Figure 8:
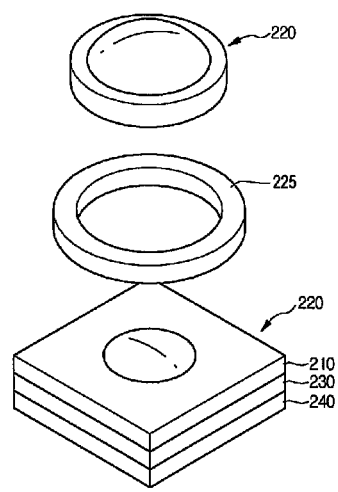
FIG. 8 is a sectional view showing a second lens unit and a lens assembly according to another embodiment.

FIG. 7 is a sectional view showing a lens barrel, a lens assembly and a second lens unit according to another embodiment and FIG. 8 is a sectional view showing a second lens unit and a lens assembly according to another embodiment. The description about the camera module according to the previous embodiment will be basically incorporated herein by reference except for the modified parts.

Referring to FIGS. 7 and 8, the second lens unit 220 is disposed closer to the object as compared with the lens assembly 200. That is, the second lens unit 220 is disposed on the lens assembly 200.

The second lens unit 220 is disposed in the second receiving groove 130 of the lens barrel and the lens assembly is disposed in the first receiving groove 120 of the lens barrel 100. At this time, the second receiving groove 130 is disposed closer to the object as compared with the first receiving groove 120. That is, the second receiving groove 130 is formed over the first receiving groove 120.

The second lens unit 220 may have the circular outer peripheral shape and the lens assembly 200 may have the polygonal outer peripheral shape. In addition, the second lens unit 220 has the surface area smaller than the surface area of the lens assembly 200. That is, the outer peripheral portion of the second lens unit 220 is disposed within the outer peripheral portion of the lens assembly 200.

In addition, a part of the second lens unit 220 may protrude from the lens barrel 100 toward the object. In detail, the lens of the second lens unit 220 protrudes from the lens barrel 100.

Thus, the camera module according to the present embodiment may have the wide angle of view. If the camera module according to the present embodiment is employed in the vehicle, the wide viewing angle can be ensured.

Figure 9:
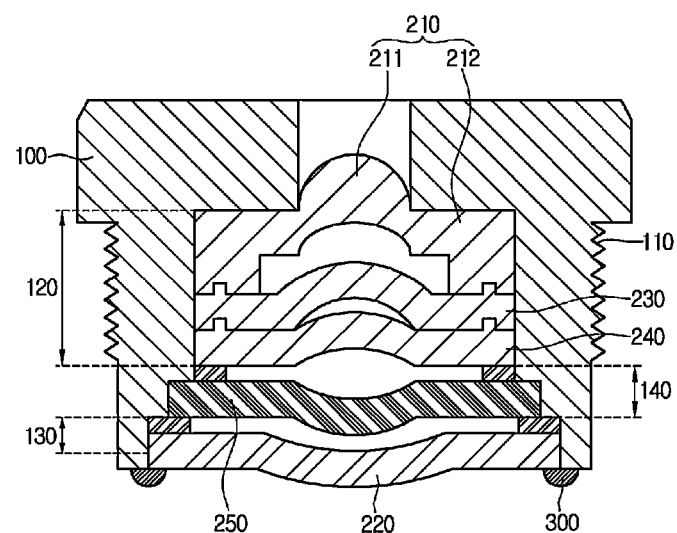
FIG. 9 is a sectional view showing a lens barrel, a lens assembly, a second lens unit and a fourth lens according to still another embodiment.

FIG. 9 is a sectional view showing a lens barrel, a lens assembly, a second lens unit and a fourth lens according to still another embodiment. The description about the camera module according to the previous embodiments will be basically incorporated herein by reference except for the modified parts.

Referring to FIG. 9, the fifth lens unit 250 is disposed between the lens assembly 200 and the second lens unit 220. The fifth lens unit 250 may have an outer peripheral shape different from the first outer peripheral shape of the lens assembly 200. In addition, the fifth lens unit 250 may have an outer peripheral shape different from that of the second lens unit 220.

Further, the fifth lens unit 250 is disposed in a third receiving groove 140 of the lens barrel 100. The lens assembly 200 is disposed in the first receiving groove 120 of the lens barrel 100. The second lens unit 220 is disposed in the second receiving groove 130 of the lens barrel 100.

The third receiving groove 140 is disposed between the first and second receiving grooves 120 and 130. The third receiving groove 140 is connected to the first and second receiving grooves 120 and 130. A step difference is formed between an inner surface of the first receiving groove 120 and an inner surface of the third receiving groove 140 and a step difference is formed between an inner surface of the second receiving groove 130 and the inner surface of the third receiving groove 140.

As described above, according to the camera module of the embodiments, the lens units having various outer peripheral shapes can be effectively disposed in the lens barrel 100.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. A camera module comprising:
   a lens barrel;
   a first lens unit having a quadrangular outer peripheral shape in the lens barrel;
   a second lens unit having a circular outer peripheral shape in the lens barrel; and
   a housing coupled with the lens barrel,
   wherein the lens barrel comprises:
   a first receiving groove for receiving the first lens unit and having an outer peripheral shape corresponding to the outer peripheral shape of the first lens unit; and
   a second receiving groove for receiving the second lens unit and having an outer peripheral shape corresponding to the outer peripheral shape of the second lens unit,
   wherein a step difference is formed between an inner surface of the first receiving groove and an inner surface of the second receiving groove, wherein a side surface of the first lens unit is in direct physical contact with the inner surface of the first receiving groove, and wherein a side surface of the second lens unit in direct physical contact with the inner surface of the second receiving groove.

2. The camera module of claim 1, further comprising a third lens unit interposed between the first and second lens units and having the quadrangular outer peripheral shape.

3. The camera module of claim 2, further comprising a fourth lens unit interposed between the third and second lens units and having the quadrangular outer peripheral shape.

4. The camera module of claim 3, wherein the first lens unit, the third lens unit and the fourth lens unit have cutting surfaces aligned on a perpendicular plane.

5. The camera module of claim 4, wherein the first lens unit, the third lens unit and the fourth lens unit include plastic and the second lens unit includes glass.

6. The camera module of claim 5, wherein the first lens unit, the third lens unit and the fourth lens unit are sequentially laminated.

7. The camera module of claim 1, further comprising a fifth lens unit interposed between the first and second lens units and having the circular outer peripheral shape.

8. The camera module of claim 2, wherein the first lens unit is disposed closer to an object as compared with the second lens unit.

9. The camera module of claim 2, wherein the second lens unit is disposed closer to an object as compared with the first lens unit.

10. The camera module of claim 1, further comprising a fifth lens unit interposed between the first and second lens units, wherein the lens barrel further comprises a third receiving groove for receiving the fifth lens unit, and wherein a step difference is formed between an inner surface of the first receiving groove and an inner surface of the third receiving groove and between an inner surface of the second receiving groove and the inner surface of the third receiving groove.

11. The camera module of claim 1, further comprising a fixing module for fixing the first and second lens units to the lens barrel.

12. The camera module of claim 1, wherein the lens barrel and the housing include a male screw part or a female screw part.

13. The camera module of claim 1, wherein the lens barrel is coupled with the housing in a male-female combination.

14. The camera module of claim 1, wherein the side surface of the first lens unit includes a first perpendicular surface that is perpendicular to a bottom surface of the first lens unit, and the first perpendicular surface of the first lens unit is in direct physical contact with the inner surface of the first receiving groove, wherein the side surface of the second lens unit includes a second perpendicular surface that is perpendicular to a bottom surface of the second lens unit, and the second perpendicular is in direct physical contact with the inner surface of the second receiving groove.

15. The camera module of claim 2, wherein the second lens unit is a higher performance lens unit than is the first lens unit.

16. The camera module of claim 3, wherein a side surface of the third lens unit is in direct physical contact with the inner surface of the first receiving groove, and wherein a side surface of the fourth lens unit is in direct physical contact with the inner surface of the first receiving groove.

17. The camera module of claim 4, wherein the cutting surfaces are the side surface of the first lens unit, a side surface of the third lens unit, and a side surface of the fourth lens unit.

* * * * *